US012783519B2

(12) United States Patent
Miyashita et al.

(10) Patent No.: US 12,783,519 B2
(45) Date of Patent: Nov. 3, 2026

(54) METHOD AND INFORMATION PROCESSING DEVICE

(71) Applicant: Kioxia Corporation, Tokyo (JP)

(72) Inventors: Daisuke Miyashita, Kawasaki (JP); Taiga Ikeda, Kawasaki (JP); Jun Deguchi, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 136 days.

(21) Appl. No.: 18/333,949

(22) Filed: Jun. 13, 2023

(65) Prior Publication Data

US 2024/0095244 A1 Mar. 21, 2024

(30) Foreign Application Priority Data

Sep. 20, 2022 (JP) ................................ 2022-149134

(51) Int. Cl.

| | |
|---|---|
| ***G06F 16/245*** | (2019.01) |
| ***G06F 16/2453*** | (2019.01) |
| ***G06F 16/2455*** | (2019.01) |
| ***G06N 3/08*** | (2023.01) |

(52) U.S. Cl.

CPC .... *G06F 16/2455* (2019.01); *G06F 16/24542* (2019.01); *G06N 3/08* (2013.01)

(58) Field of Classification Search

CPC .. G06F 16/2455; G06F 16/24542; G06N 3/08

See application file for complete search history.

(56) References Cited

U.S. PATENT DOCUMENTS

| | | | | |
|---|---|---|---|---|
| 11,151,608 | B1 * | 10/2021 | Guo | G06Q 30/0277 |
| 11,182,314 | B1 * | 11/2021 | Borkovic | G06N 3/063 |
| 11,537,719 | B2 * | 12/2022 | Li | G06F 21/563 |
| 11,574,020 | B1 * | 2/2023 | Zhai | G06F 16/84 |

(Continued)

FOREIGN PATENT DOCUMENTS

| | | |
|---|---|---|
| JP | 2004-46612 A | 2/2004 |
| JP | 2007-109163 A | 4/2007 |

(Continued)

OTHER PUBLICATIONS

Ren et al., "HM-ANN: Efficient Billion-Point Nearest Neighbor Search on Heterogeneous Memory", 34th Conference on Neural Information Processing Systems (NeurIPS 2020), 13 pages.

(Continued)

*Primary Examiner* — Alicia M Willoughby

(74) *Attorney, Agent, or Firm* — Oblon, McClelland, Maier & Neustadt, L.L.P.

(57) ABSTRACT

According to an embodiment, a method includes receiving a query, and selecting one of first objects on the basis of the query and a neural network model. Each of the first objects is associated with one or more pieces of first data in a group of first data stored on a first memory. The method further includes calculating a metric of a distance between the query and one or more pieces of second data. The one or more pieces of second data are one or more pieces of first data associated with a second object. The second object is the one of the first objects having been selected. The method further includes identifying third data on the basis of the metric of the distance. The third data is first data closest to the query in the group of the first data.

16 Claims, 10 Drawing Sheets

(56) References Cited

U.S. PATENT DOCUMENTS

| | | | | |
|---|---|---|---|---|
| 11,704,318 | B1 * | 7/2023 | Keivanloo | G06F 16/248 707/769 |
| 12,008,026 | B1 * | 6/2024 | Sanz | G06F 16/3347 |
| 12,141,732 | B1 * | 11/2024 | Solmer | G06Q 10/067 |
| 2014/0010407 | A1 * | 1/2014 | Sinha | G06T 7/73 382/103 |
| 2016/0057583 | A1 * | 2/2016 | Nguyen | H04W 4/029 370/329 |
| 2016/0062731 | A1 * | 3/2016 | Lin | G06F 16/319 707/742 |
| 2016/0283374 | A1 * | 9/2016 | Pal | G06F 12/084 |
| 2017/0140012 | A1 * | 5/2017 | Bortnikov | G06V 10/763 |
| 2019/0205331 | A1 | 7/2019 | Cevahir | |
| 2021/0110322 | A1 * | 4/2021 | Jha | G06Q 10/0637 |
| 2021/0149963 | A1 * | 5/2021 | Agarwal | G06F 16/90332 |
| 2022/0051080 | A1 * | 2/2022 | Hajarnis | G06N 3/08 |
| 2023/0082536 | A1 * | 3/2023 | Hoydis | H04L 1/0041 706/25 |
| 2023/0170092 | A1 * | 6/2023 | Moon | G16H 10/60 705/2 |
| 2023/0185468 | A1 | 6/2023 | Ikeda et al. | |
| 2023/0229719 | A1 * | 7/2023 | Diamandis | G06F 16/9535 707/707 |
| 2023/0281516 | A1 * | 9/2023 | Ben-Itzhak | G06N 20/00 706/12 |
| 2023/0325651 | A1 * | 10/2023 | Tagomori | G06F 18/40 706/15 |
| 2024/0070801 | A1 * | 2/2024 | Wu | G06V 10/82 |
| 2024/0095244 | A1 * | 3/2024 | Miyashita | G06N 3/08 |
| 2024/0152622 | A1 * | 5/2024 | Xia | G06F 21/552 |

FOREIGN PATENT DOCUMENTS

| | | | |
|---|---|---|---|
| JP | 6378855 | B1 | 8/2018 |
| JP | 2023-86507 | A | 6/2023 |

OTHER PUBLICATIONS

Tay et al., “Transformer Memory as a Differentiable Search Index”, 36th Conference on Neural Information Processing Systems (NeurIPS 2022), 14 pages.

Abu-Libdeh et al. “Learned Indexes for a Google-scale Disk-based Database”, Workshop on ML for Systems at NeurIPS 2020, 5 pages.

Subramanya et al. “DiskANN: Fast Accurate Billion-point Nearest Neighbor Search on a Single Node”, 33rd Conference on Neural Information Processing Systems (NeurIPS 2019), 11 pages.

Malkov et al. “Efficient and robust approximate nearest neighbor search using Hierarchical Navigable Small World graphs”, IEEE Transactions on Pattern Analysis & Machine Intelligence, 2016, 13 pages.

* cited by examiner

METHOD AND INFORMATION PROCESSING DEVICE

CROSS-REFERENCE TO RELATED APPLICATIONS

This application is based upon and claims the benefit of priority from Japanese Patent Application No. 2022-149134, filed on Sep. 20, 2022; the entire contents of which are incorporated herein by reference.

FIELD

Embodiments described herein relate generally to a method and an information processing device.

BACKGROUND

In the conventional art, there are methods or devices for performing information processing of searching for data similar to a query as input data and outputting the search result. Required in such methods or devices are the speed for the query response and the accuracy of the search relating to information processing for outputting a result to an input query. As a nearest neighbor search algorithm for achieving both the speed of the query response and the accuracy of the search, an approximate nearest neighbor search (ANNS) algorithm using a plurality of heterogeneous memories is known.

DETAILED DESCRIPTION

According to an embodiment, a method includes receiving a query, and selecting one of first objects on the basis of the query and a neural network model. Each of the first objects is associated with one or more pieces of first data in a group of first data stored on a first memory. The method further includes calculating a metric of a distance between the query and one or more pieces of second data. The one or more pieces of second data are one or more pieces of first data associated with a second object. The second object is the one of the first objects having been selected. The method further includes identifying third data on the basis of the metric of distance. The third data is first data closest to the query in the group of the first data.

A nearest neighbor search method according to one of embodiments is executed by, for example, an information processing device including a processor, a first memory, and a second memory. The first memory is a memory having a larger capacity than that of the second memory. The second memory is capable of operating at a higher speed than the first memory. Hereinafter, an example will be described, in which a nearest neighbor search according to one of embodiments is performed in a computer including a solid state drive (SSD) as the first memory and a dynamic random access memory (DRAM) as the second memory.

Note that the nearest neighbor search method according to one of embodiments may be implemented by collaboration of two or more information processing devices connected to each other via a network. Alternatively, the nearest neighbor search according to one of embodiments may be implemented by a storage device that includes a storage medium such as a NAND flash memory device as the first memory, a DRAM as the second memory, and a processor.

Hereinafter, the method and the information processing device according to one of embodiments will be described in detail by referring to the accompanying drawings. Note that the present invention is not limited by these embodiments.

First Embodiment

Figure 1:
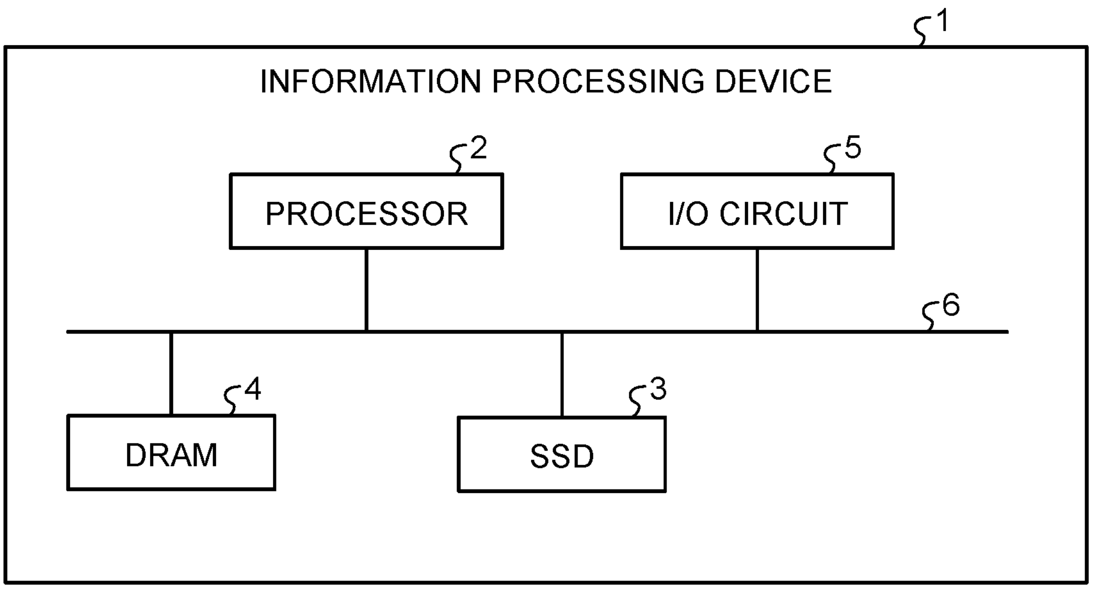
FIG. 1 is a schematic diagram illustrating an example of a hardware configuration of an information processing device according to a first embodiment.

FIG. 1 is a schematic diagram illustrating an example of a hardware configuration of an information processing device according to a first embodiment.

An information processing device 1 is a computer including a processor 2, an SSD 3 that is an example of a first memory, a DRAM 4 that is an example of a second memory, an input and output (I/O) circuit 5, and a bus 6 that electrically connects these. Note that the first memory and the second memory are not limited to the above. For example, the first memory may be any storage memory. The first memory may be a universal flash storage (UFS) device or a magnetic disk device.

The processor 2 executes a specific operation in accordance with a computer program. The processor 2 is, for example, a central processing unit (CPU) or a graphics processing unit (GPU). When a query as input data is input to the information processing device 1, the processor 2 executes a specific operation based on the input query using the SSD 3 and the DRAM 4.

The SSD 3 is a storage memory having a larger capacity than the DRAM 4. The SSD 3 includes a NAND flash memory as a storage medium.

The DRAM 4 has a smaller capacity than that of the SSD 3 but can operate at a higher speed than the SSD 3. Here, the operation includes a data write operation and a data read operation.

The I/O circuit 5 is an interface device to which input and output devices can be connected. Input and output devices include, for example, an input device, a display device, a network device, a printer, or the like.

Figure 2:
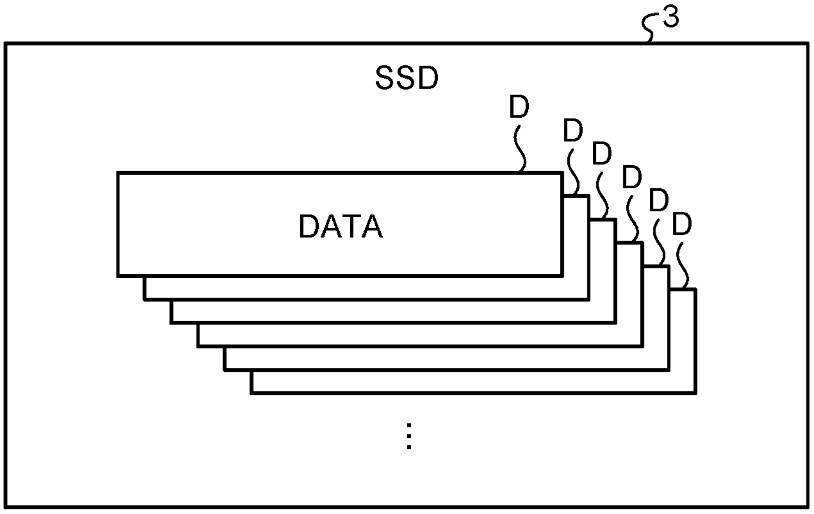
FIG. 2 is a schematic diagram illustrating an example of information stored on an SSD according to the first embodiment.

FIG. 2 is a schematic diagram illustrating an example of information stored on the SSD 3 according to the first embodiment.

The SSD 3 stores a group of data D. The type of each piece of data D is not limited to a specific type. Each piece of data D has N (where N is an integer greater than or equal to 1) elements. In other words, each piece of data D is an N-dimensional vector. Each piece of data D is data of an image, data of a document, or any other type of data, or data generated from these types of data. In one example, each piece of data D is N features extracted from an image. In another example, each piece of data D is a purchase log of products classified into N categories by different users. The number of elements N is common to all the data D and a query Q to be described later.

In response to receiving a query input to the information processing device 1, the processor 2 searches data D that is closest to the input query from a group of data D stored on the SSD 3.

In the present specification, the distance is a scale representing similarity between pieces of data. Mathematically, the distance is a Euclidean distance, for example. Note that the mathematical definition of the distance is not limited to the Euclidean distance. Additionally, a metric used for evaluation of the distance is not limited to the Euclidean distance or the like, and any metric can be used as long as the metric represents the distance. Herein, as an example, the inner product value is used as the metric of the distance. The inner product value increases as the distance is shorter.

In the first embodiment, the group of data D in the SSD 3 is categorized into a plurality of clusters. Each of the clusters is a sub-group of data D obtained by grouping two or more pieces of data D that are close to each other. Note that there may be a cluster including only one piece of data D. Each of the clusters is an example of a first object of the first embodiment.

Figure 3:
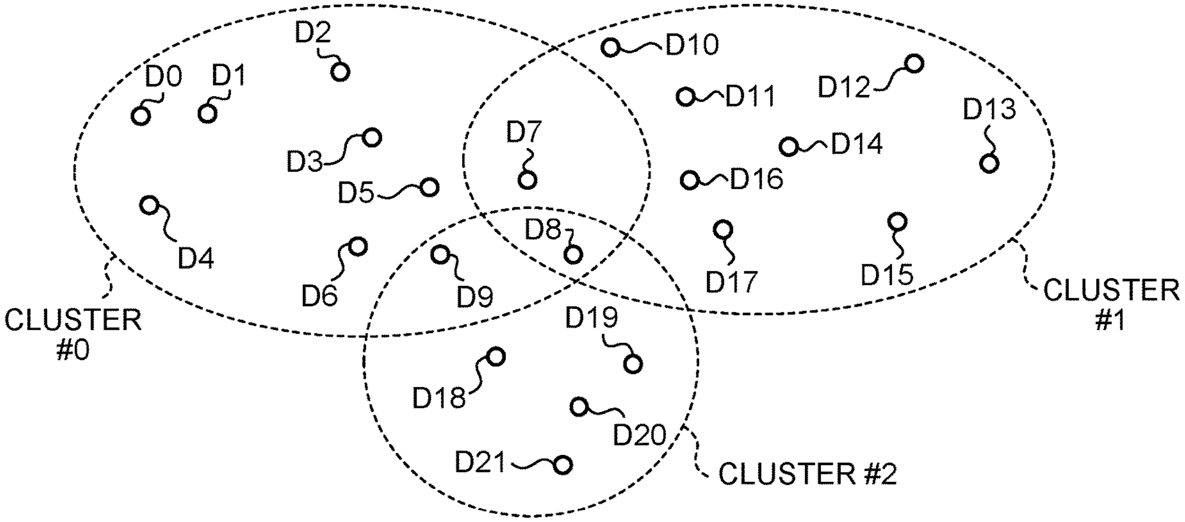
FIG. 3 is a schematic diagram for describing a nearest neighbor search executed by a processor according to the first embodiment.

FIG. 3 is a schematic diagram for describing a nearest neighbor search executed by the processor 2 according to the first embodiment. It is based on the premise that data D0 to D21 are stored on the SSD 3 as a group of data D, and that the positions of the data D0 to D21 in an N-dimensional space are drawn in the drawing. Note that, to facilitate understanding, it is based on the premise that data D is a two-dimensional vector.

In the data D0 to D21, the data D0 to D9 are grouped as a cluster #0. The data D7, D8, and D10 to D17 are grouped as a cluster #1. The data D8, D9, and D18 to D21 are grouped as a cluster #2.

The grouping may be implemented in any manner but is typically implemented on the basis of the distance between the data D. For example, the N-dimensional space, in which the data D is present, may be divided into a lattice shape, whereby a list may be set by a set of data D in each unit cell. This enables grouping two or more pieces of data D close to each other as one list. Hereinafter, in order to facilitate understanding of the description, it is based on the premise that the data D in the group are close to each other, however, this is not necessarily required for the present invention.

Note that one piece of data D may belong to only one cluster. Moreover, as in each of the data D7 to D9 in FIG. 3, one piece of data D may redundantly belong to two or more clusters.

When a query is input, the processor 2 first identifies, from among all clusters, a cluster to which data closest to the query belongs. Then, the processor 2 transfers all data D belonging to the identified cluster from the SSD 3 to the DRAM 4. Then, the processor 2 calculates the metric of the distance between each piece of data D and the query in the DRAM 4 and identifies data D closest to the query on the basis of each metric.

As technology to be compared with the first embodiment, there is a method of performing a graph-based nearest neighbor search for data in a storage memory, such as an SSD, which requires a lot of time for accessing. Such a method is referred to as a first comparative example. According to the first comparative example, in order to identify data closest to a query, the metric of the distance between candidate data and the query is calculated every time the candidate data is selected while candidate data is selected along the graph. The processing of selecting new candidate data along the graph is also referred to as "hop".

However, according to the first comparative example, every time new candidate data is selected, in other words, at every hop, there occurs processing of transferring the selected candidate data from a storage memory such as an SSD to a high-speed memory such as a DRAM, which is a work area. Therefore, it takes a lot of time to identify the data closest to the query.

According to the first embodiment, all the data D included in a cluster, to which the data D closest to the query Q belongs, is collectively transferred from the SSD 3 to the DRAM 4. The time required for accessing the DRAM 4 is shorter than the time required for accessing the SSD 3. Therefore, the time required for identifying the data D closest to the query Q is shortened. Thus, according to the first embodiment, the speed of the query response is enhanced.

Figure 4:
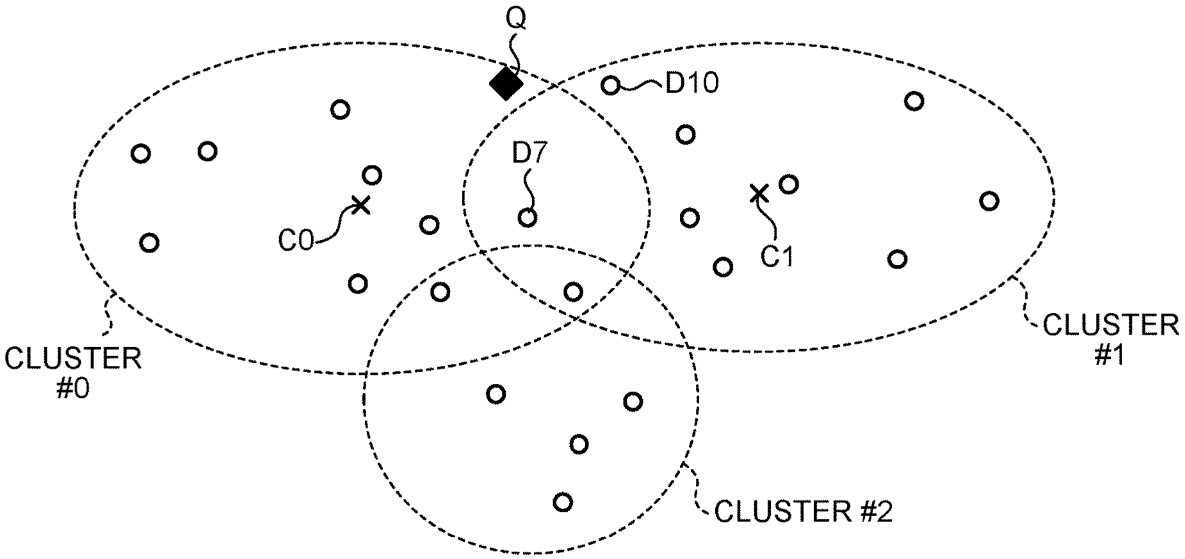
FIG. 4 is a schematic diagram for describing an example of a positional relationship among clusters and a query according to the first embodiment.

FIG. 4 is a schematic diagram for describing an example of a positional relationship among the clusters and a query according to the first embodiment.

In the example illustrated in FIG. 4, data closest to a query Q among the data D0 to D21 is the data D10 belonging to the cluster #1.

Meanwhile, a second comparative example will be described as other technology to be compared with the first embodiment. According to the second comparative example, one representative point is set for each of the clusters. The representative point may be one piece of data selected from all the data belonging to the cluster or may be new data corresponding to the center or the center of gravity of the cluster. The cluster, to which the data closest to the query belongs, is identified on the basis of the distances from the representative points of the respective clusters to the data. For example, a cluster, in which a representative point closest to the query has been set, is identified as the cluster to which the data closest to the query belongs.

However, there may be a case where the cluster, in which the representative point closest to the query has been set, is different from the cluster to which the data closest to the query belongs. If a cluster different from the cluster to which the data closest to the query belongs is erroneously identified as the cluster to which the data closest to the query belongs, it is not possible to identify the data closest to the query.

In the example illustrated in FIG. 4, let us examine a case where the center of gravity CO of the cluster #0 has been set as the representative point of the cluster #0 and the center of gravity Cl of the cluster #1 has been set as the representative point of the cluster #1. The center of gravity CO of the cluster #0 is closer to the query Q than the center of gravity Cl of the cluster #1 is. Therefore, according to the second comparative example, the cluster #0 is identified as the cluster to which the data closest to the query Q belongs. Then, the data D7 closest to the query Q among the data belonging to the cluster #0 is erroneously detected as the data closest to the query Q among all the data. In this manner, according to the second comparative example, there are cases where estimation is erroneously performed.

In the first embodiment of the present disclosure, a neural network model (neural network model 43 to be described later), which has been trained, is used to identify the cluster #1, to which the data D10 closest to the query Q in the group of data D belongs, as the cluster to which the data closest to the query belongs. By identifying the cluster, to which the data D10 closest to the query Q belongs, with the trained neural network model, the estimation error described in the description of the second comparative example is reduced, and the accuracy of the search is enhanced.

Figure 5:
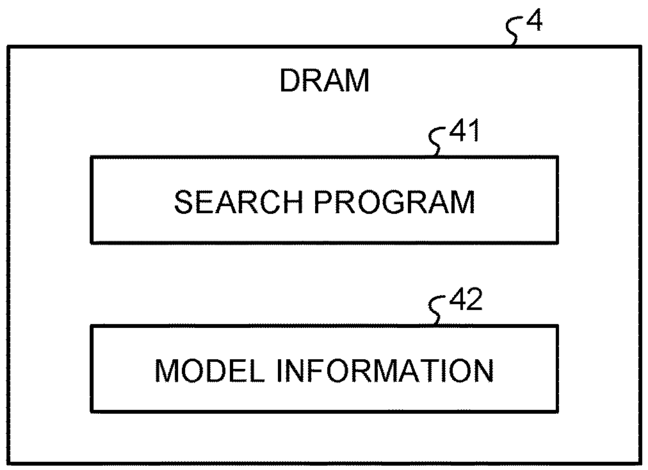
FIG. 5 is a schematic diagram illustrating an example of information stored on a DRAM according to the first embodiment.

FIG. 5 is a schematic diagram illustrating an example of information stored on the DRAM 4 according to the first embodiment.

A search program 41 and model information 42 are loaded into the DRAM 4. The search program 41 and the model information 42 are stored in advance on a desired non-volatile memory (for example, the SSD 3). The processor 2 loads the search program 41 and the model information 42 into the DRAM 4 in accordance with a specific processing (for example, an instruction to start the search program 41).

The processor 2 searches for data closest to the query in accordance with the search program 41 loaded into the DRAM 4.

The model information 42 is information in which the structure of the neural network model 43 is recorded. The model information 42 includes, for example, definitions of nodes, definitions of connection relationships among the nodes, and biases. In the model information 42, each of the nodes is associated with an activation function and a trained weight. At the time of a search, the processor 2 performs operation as the neural network model 43 by using the model information 42 loaded into the DRAM 4, thereby identifying a cluster to which the data closest to the query Q belongs.

Figure 6:
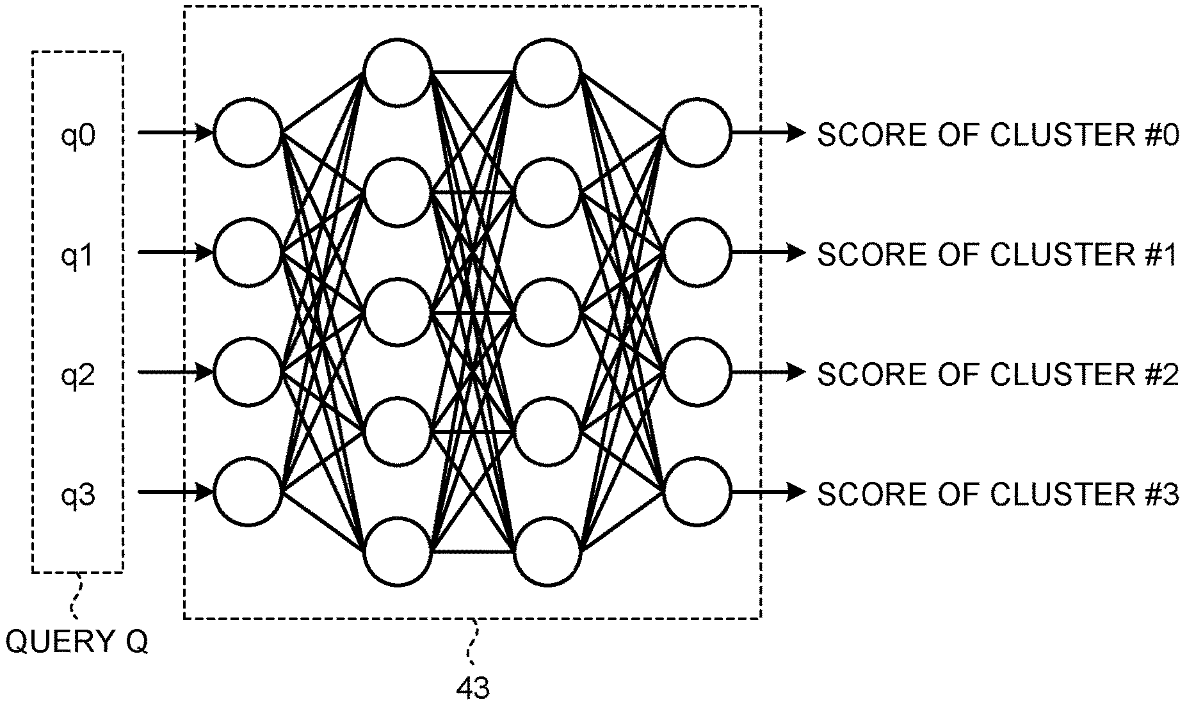
FIG. 6 is a schematic diagram illustrating an example of a structure of a neural network model according to the first embodiment.

FIG. 6 is a schematic diagram illustrating an example of a structure of the neural network model 43 according to the first embodiment. Note that, in the example of this drawing, it is based on the premise that the data D and the query Q are four-dimensional vectors and have four elements. It is also based on the premise that the group of data D in the SSD 3 is grouped into four clusters #0 to #3.

In the neural network model 43 illustrated in FIG. 6, circular figures indicate nodes, and line segments connecting nodes indicate edges. As an example, the neural network model 43 includes an input layer, two hidden layers, and an output layer.

The input layer includes nodes whose number corresponds to the number of elements constituting the query Q, namely, four nodes. Each of four nodes of the input layer is associated with one of four elements q0 to q3 of the query Q on a one-to-one basis and accepts input of the associated element.

The output layer includes nodes whose number corresponding to the number of clusters, namely, four nodes. Each of the four nodes included in the output layer is associated with one of the clusters #0 to #3 on a one-to-one basis and outputs a score for the associated cluster.

A score represents a probability that a cluster corresponding to each node corresponds to the cluster to which the data closest to the query Q belongs. In one example, it is based on the premise that the higher the score is, the higher the probability is that the cluster corresponding to the node having output the score corresponds to the cluster to which the data closest to the query Q belongs. Note that the relationship between the score and the probability is not limited to the above.

The processor 2 inputs the query Q to the input layer. Then, in each node of the hidden layers and the output layer, the processor 2 multiplies biases and input values from the respective nodes of the preceding layer by weights, applies an activation function to the total sum of the values obtained after the multiplication by the weights, and outputs a value obtained by applying the activation function.

The processor 2 acquires the scores for the clusters from the output layer and identifies a cluster corresponding to a node to which the highest score is output, as the cluster to which the data closest to the query Q belongs.

Hereinafter, a score output from a node associated with a cluster #X is referred to as a score of a cluster #X (X in the example of FIG. 6 is an integer in a range of 0 to 3).

Note that the neural network model 43 illustrated in FIG. 6 is simply an example. The number of layers included in the neural network model 43, the number of nodes in the hidden layers, the connection relationships among the nodes, the calculation method in each node, and others can be optionally modified by a designer.

Figure 7:
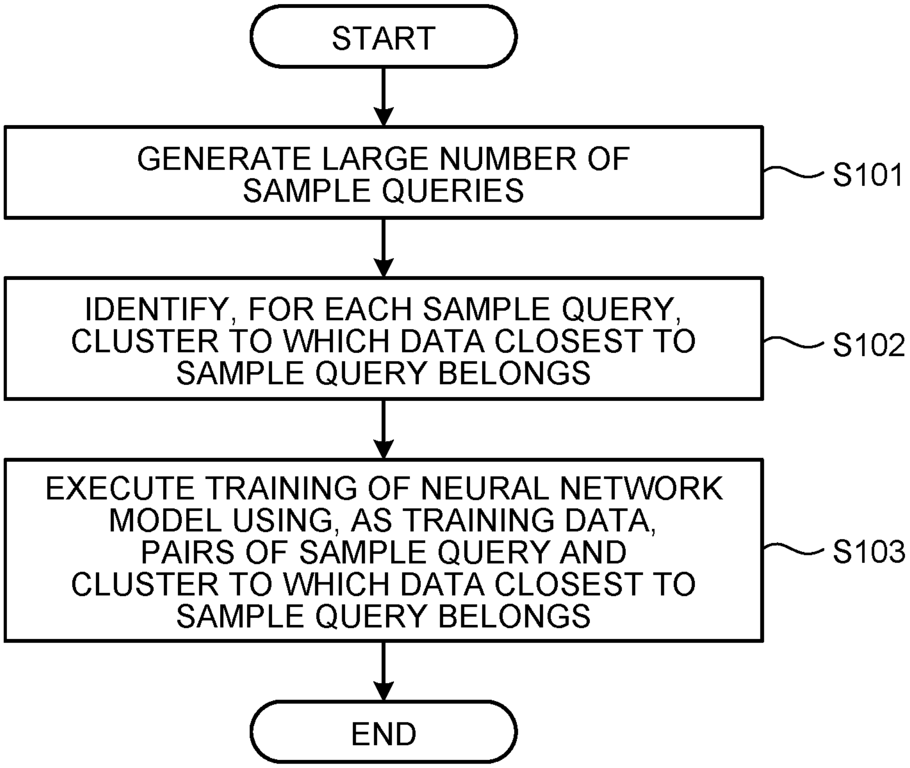
FIG. 7 is a flowchart describing an example of a training method of the neural network model according to the first embodiment.

FIG. 7 is a flowchart describing an example of a training method of the neural network model 43 according to the first embodiment. Note that a series of processing illustrated in this drawing may be executed in the information processing device 1 or may be executed in any other computer. Note that the series of processing illustrated in this drawing is executed in a computer that can access the same group as the group of the data D stored on the SSD 3. As an example, a description will be given herein on the premise that the series of processing illustrated in this drawing is executed in the information processing device 1.

First, the processor 2 generates a large number of sample queries (S101). The processor 2 generates a larger number of sample queries from a given number of queries on the basis of, for example, a random number generating program or the like. Note that the method of generating the sample queries is not limited to the above.

Subsequently, the processor 2 identifies a cluster to which data closest to the sample query belongs for each of the sample queries (S102). For example, the processor 2 calculates the distance between each of the sample queries and each piece of data D, thereby identifying data D closest to each of the sample queries. Then, the processor 2 identifies a cluster to which the identified data D belongs.

Note that the processing of S102 is processing for creating training data. Therefore, accuracy is required for the processing of S102. The series of processing illustrated in FIG. 7 is executed in advance before the nearest neighbor search for the actual query Q. The series of processing illustrated in FIG. 7 is not required to be completed at high speed. Therefore, in the processing of S102, the processor 2 is allowed to take a time for accurately obtaining the cluster to which the data closest to the sample queries belongs.

Subsequent to S102, the processor 2 executes training of the neural network model 43 using a large number of obtained pairs of a sample query and a cluster to which data closest to the sample query belongs as training data (S103). As a result, the weight for each node is determined, and the model information 42 is generated. Then, the training is completed.

Figure 8:
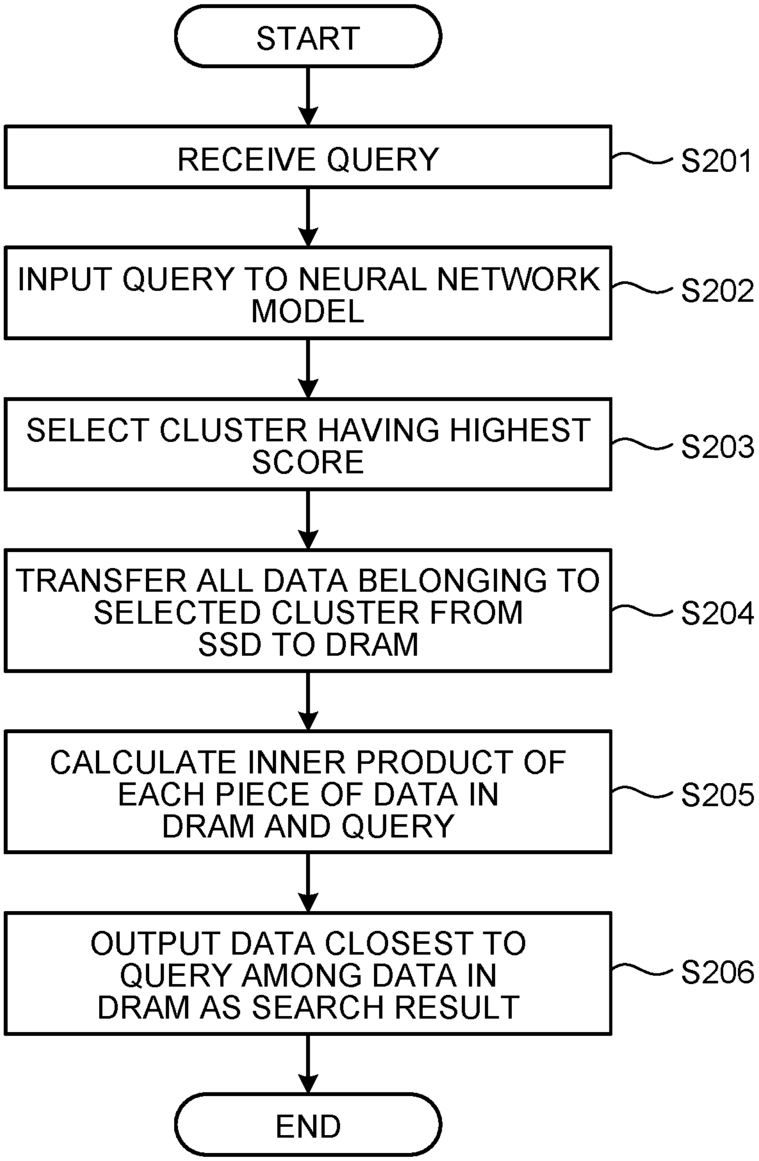
FIG. 8 is a flowchart describing an example of a nearest neighbor search method according to the first embodiment.

FIG. 8 is a flowchart describing an example of the nearest neighbor search method according to the first embodiment. The processor 2 executes a series of processing illustrated in the drawing in accordance with the search program 41.

Upon receiving a query Q input to the information processing device 1 (S201), the processor 2 inputs the query Q to the neural network model 43 (S202).

The processor 2 selects a cluster whose score is the highest, on the basis of the scores for the respective clusters output from the neural network model 43 (S203). Then, the processor 2 transfers all the data D belonging to the selected cluster from the SSD 3 to the DRAM 4 (S204).

The processor 2 calculates an inner product between the query Q and each piece of data D in the DRAM 4 (S205). Note that the inner product of two pieces of data is an example of the metric of the distance between the two pieces of data. The closer the distance between the two pieces of data is, the larger the value of the inner product of the two pieces of data is. Note that the metric of the distance between the two pieces of data is not limited to the inner product.

The processor 2 identifies a piece of data D closest to the query Q among the pieces of data D in the DRAM 4 on the basis of the inner product values between the query Q and each piece of data D in the DRAM 4, and outputs the identified data D as a search result (S206). For example, in a case where the inner product is used as the metric of the distance, the processor 2 outputs, as the search result, a piece of data D for which the largest inner product value has been obtained. Then, the series of processing of the nearest neighbor search ends.

As described above, according to the first embodiment, the processor 2 receives the input of the query Q and selects one cluster on the basis of the neural network model 43. The processor 2 calculates the metric of the distance between each piece of data D included in the selected cluster and the query Q. The processor 2 identifies data D closest to the query Q among the data D included in the selected cluster as the data D closest to the query Q in the group of the data D in the SSD 3 on the basis of the metric of the distance between each piece of data D included in the selected cluster and the query Q.

Therefore, the speed of the query response and the accuracy of the search can be both enhanced.

In addition, in the first embodiment, the processor 2 transfers the cluster selected on the basis of the neural network model 43 from the SSD 3 to the DRAM 4 and calculates the metric of the distance between each piece of data D in the DRAM 4 and the query Q.

Therefore, the speed of the query response can be enhanced.

Moreover, in the first embodiment, the neural network model 43 outputs, for each cluster, a score representing the possibility of including the data D closest to the query Q in the group of the data D in the SSD 3 in a case where the query Q is input. The processor 2 inputs the query Q to the neural network model 43 and selects a cluster having the highest possibility of including the data D closest to the query Q on the basis of the score for each cluster output from the neural network model 43.

Therefore, the accuracy of the query response can be enhanced.

MODIFICATION OF FIRST EMBODIMENT

In the above-described first embodiment, all the data D belonging to one cluster is collectively transferred from the SSD 3 to the DRAM 4. In order to minimize the time required for transferring all the data D belonging to each cluster, a set of pieces of data D belonging to each cluster may be disposed in a continuous area in an address space provided by an SSD 3 to a processor 2.

Figure 9:
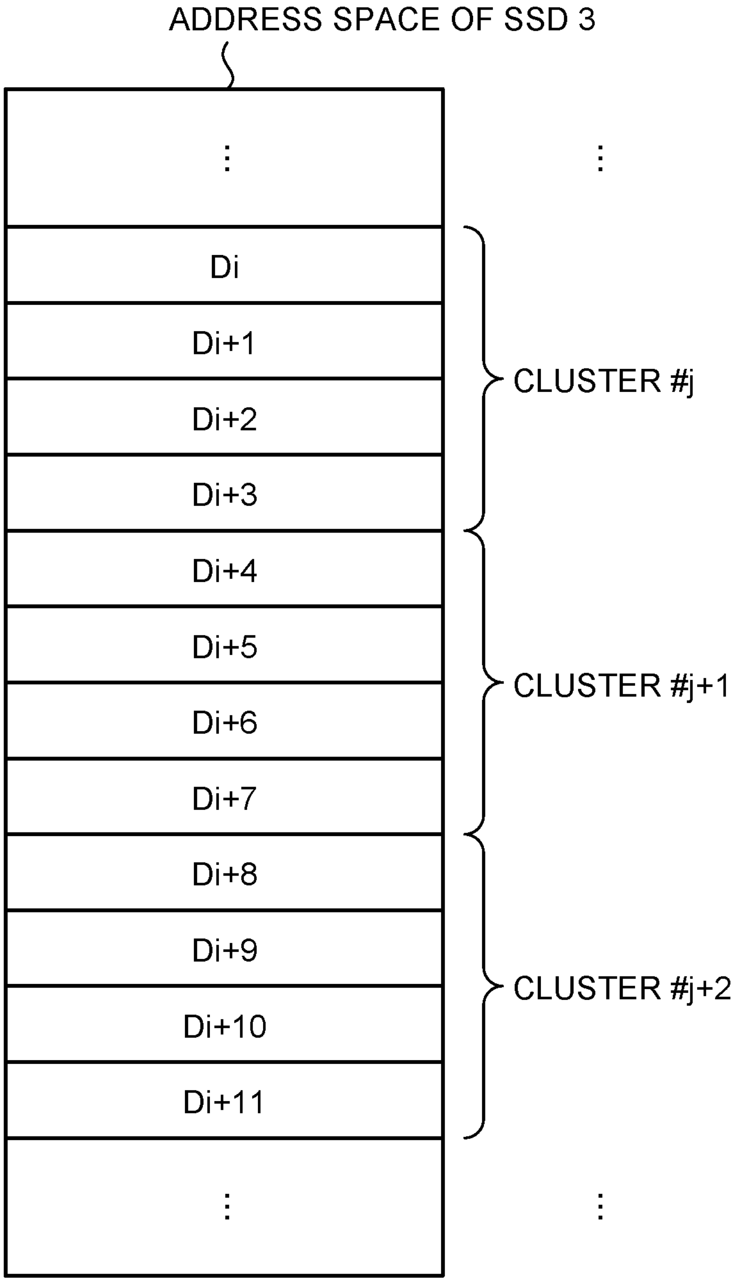
FIG. 9 is a schematic diagram illustrating an arrangement example of data stored on an SSD according to a modification of the first embodiment.

Specifically, FIG. 9 is a schematic diagram illustrating an arrangement example of data D stored on an SSD 3 according to a modification of the first embodiment. According to the example illustrated in the drawing, a cluster #j includes a set of data Di to Di+3, and the set of data Di to Di+3 is disposed in a continuous area in the address space of the SSD 3. A cluster #j+1 includes a set of data Di+4 to Di+7, and the set of data Di+4 to Di+7 is disposed in a continuous area in the address space of the SSD 3. A cluster #j+2 includes a set of data Di+8 to Di+11, and the set of data Di+8 to Di+11 is disposed in a continuous area in the address space of the SSD 3.

With such a configuration, the processor 2 is able to acquire all the data D included in a desired cluster only by issuing, to the SSD 3, a single read-command including the position in the address space and the size. Therefore, it is possible to reduce the time required for transferring all the data D belonging to the desired cluster from the SSD 3 to the DRAM 4.

Second Embodiment

As described above, in the graph-based nearest neighbor search using a group of data stored on a storage memory such as an SSD as a search range, transfer from the storage memory to a volatile memory occurs at every hop. Therefore, as the hop count is larger, the time required for the search is longer.

In a second embodiment, the time required for a search is suppressed by reducing the hop count required in a graph-based nearest neighbor search as much as possible. An information processing device according to the second embodiment will be referred to as an information processing device 1*a*. Moreover, in the description below, matters different from those of the first embodiment will be described, and description of the same matters as those of the first embodiment will be omitted or briefly described.

Figure 10:
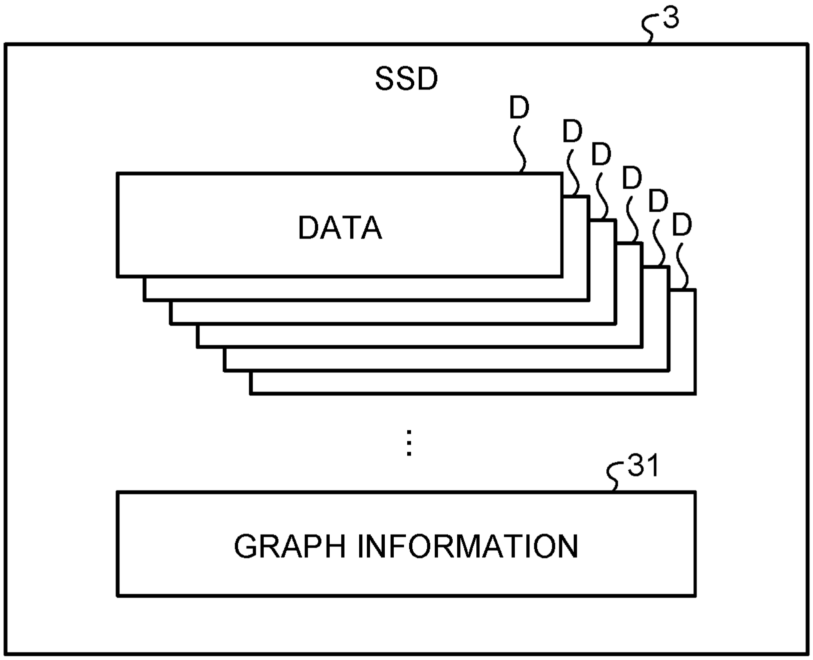
FIG. 10 is a schematic diagram illustrating an example of information stored on an SSD included in an information processing device according to a second embodiment.

FIG. 10 is a schematic diagram illustrating an example of information stored on an SSD 3 included in the information processing device 1*a* according to the second embodiment.

As in the first embodiment, a group of data D is stored on the SSD 3. The SSD 3 also stores graph information 31 that defines connection among the data D. The graph information 31 is generated in advance by a designer or a specific computer program.

Figure 11:
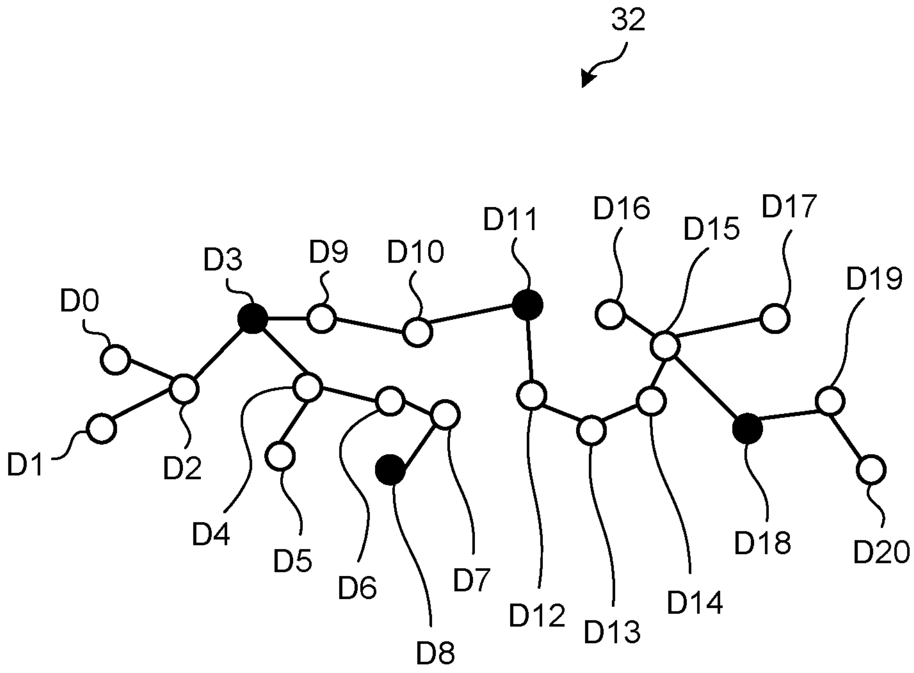
FIG. 11 is a schematic diagram illustrating an example of a graph defined by graph information according to the second embodiment.

FIG. 11 is a schematic diagram illustrating an example of a graph defined by the graph information 31 according to the second embodiment. It is based on the premise that data D0 to data D20 are stored on the SSD 3 as the group of data D.

As an example of the graph according to the second embodiment, a graph 32 is formed such that each of the pieces of data D0 to D20 is a node. Each of the pieces of data D0 to D20 is connected to all the pieces of data D0 to D20 via one or more edges and 0 or more pieces of data D. The edge is a path on which a hop is allowed.

The graph 32 includes two or more nodes each being depicted by a filled circle. Each filled circle indicates an entry point candidate. The entry point candidate refers to a node of an entry point, namely, a node that can be a starting point of a search. It is based on the premise here that, as an example, the data D3, the data D8, the data D11, and the data D18 are entry point candidates. For example, pieces of data D randomly selected from the group of data D are set as entry point candidates. Note that the method of setting the entry point candidate is not limited to the above.

In the second embodiment, the processor 2 selects an entry point from the entry point candidates in such a manner that the hop count required for the search becomes as small as possible. Note that an entry point candidate is an example of a first object according to the second embodiment.

Figure 12:
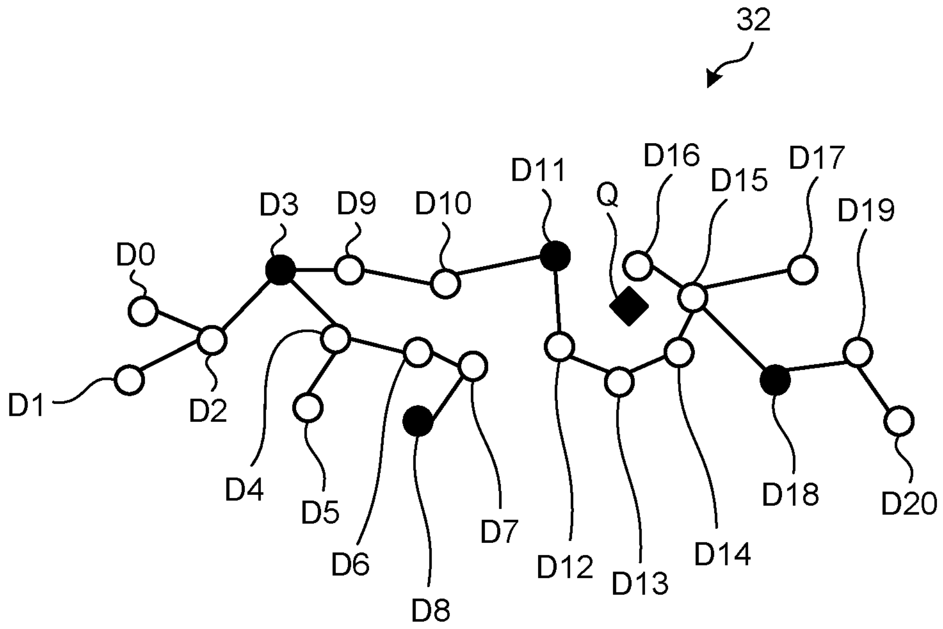
FIG. 12 is a schematic diagram for describing an example of a method of selecting an entry point according to the second embodiment.

FIG. 12 is a schematic diagram for explaining an example of an entry point selection method according to the second embodiment.

In the example of FIG. 12, the data D16 corresponds to the data closest to the query Q. Therefore, in a case where the data D18 is selected as an entry point, it is possible to identify the data D16 with a minimum hop count, specifically, two hops from the data D18 to the data D15 and from the data D15 to the data D16. The processor 2 estimates an entry point candidate by which the data closest to the query Q can be identified with such a minimum hop count.

A third comparative example will be described as technology to be compared with the second embodiment. According to the third comparative example, an entry point candidate is selected on the basis of the distance between each of entry point candidates and a query Q.

In the example of FIG. 12, the entry point candidate closest to the query Q is not data D18 but data D11. Therefore, according to the third comparative example, the data D11 is selected as the entry point. In this case, five hops from the data D11 to data D12, from data D12 to data D13, from data D13 to data D14, from data D14 to data D15, and from data D15 to data D16 are required for identifying data D16 as the data closest to the query Q. Therefore, according to the third comparative example, there are cases where a large number of the hop count is required for identifying the data closest to the query Q.

In contrast, according to the second embodiment, the processor 2 utilizes a trained neural network model (neural network model 43*a* to be described later) for identifying an entry point candidate by which the data D16 closest to the query Q can be identified with the minimum hop count.

Figure 13:
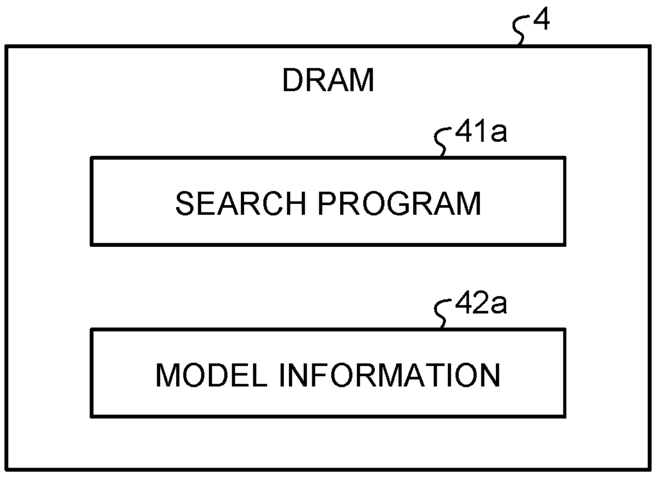
FIG. 13 is a schematic diagram illustrating an example of information stored on a DRAM according to the second embodiment.

FIG. 13 is a schematic diagram illustrating an example of information stored on a DRAM 4 according to the second embodiment.

A search program 41*a* and model information 42*a* are loaded into the DRAM 4.

The processor 2 searches for data closest to the query in accordance with the search program 41*a* loaded into the DRAM 4.

The model information 42*a* is information in which the structure of the neural network model 43*a* is recorded. At the time of a search, the processor 2 performs operation as the neural network model 43*a* by using the model information 42*a* loaded into the DRAM 4, thereby estimating an entry point candidate by which the data D16 closest to the query Q can be identified with the minimum hop count.

Figure 14:
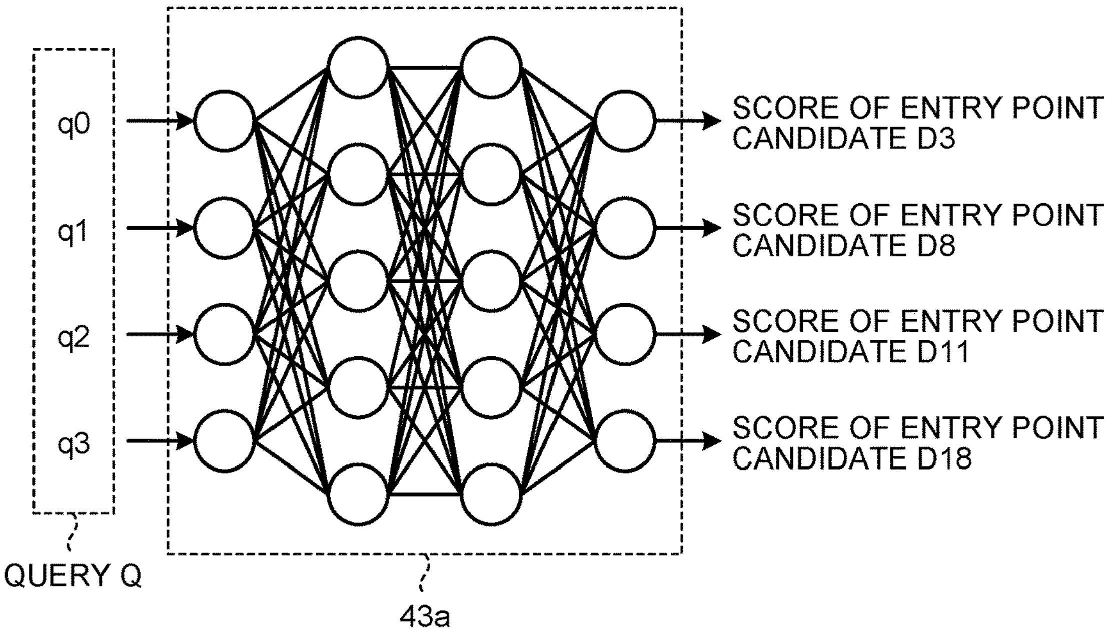
FIG. 14 is a schematic diagram illustrating an example of a structure of a neural network model according to the second embodiment.

FIG. 14 is a schematic diagram illustrating an example of a structure of the neural network model 43*a* according to the second embodiment. Note that, in the example of this drawing, it is based on the premise that the data D and the query Q are four-dimensional data and have four elements. It is also based on the premise here that data D3, data D8, data D11, and data D18 are entry point candidates.

In the example illustrated in FIG. 14, the neural network model 43*a* includes, as an example, an input layer, two hidden layers, and an output layer.

The input layer includes nodes whose number corresponds to the number of elements constituting the query Q, namely, four nodes. Each of four nodes of the input layer is associated with one of four elements q0 to q3 of the query Q on a one-to-one basis and accepts input of the associated element.

The output layer includes nodes whose number corresponds the number of the entry point candidates, that is, four nodes. Each of the four nodes included in the output layer is associated with one of the four entry point candidates, namely, the data D3, the data D8, the data D11, and the data D18, on a one-to-one basis and outputs a score regarding an entry point candidate associated thereto.

In the second embodiment, a score represents a probability that an entry point candidate corresponding to each node corresponds to the entry point by which the data D16 closest to the query Q can be identified with the minimum hop count. As one example, it is based on the premise that the higher the score is, the higher the probability is that an entry point candidate corresponding to the node that has output the score corresponds to the entry point by which the data D16 closest to the query Q can be identified with the minimum hop count. Note that the relationship between the score and the probability is not limited to the above.

The processor 2 inputs the query Q to the input layer. Then, in each node of the hidden layers and the output layer, the processor 2 multiplies biases and input values from the respective nodes of the preceding layer by weights, applies an activation function to the total sum of the values obtained after the multiplication by the weights, and outputs a value obtained by applying the activation function. The processor 2 acquires the scores from the output layer for the respective clusters and identifies an entry point candidate corresponding to a node to which the highest score is output as the entry point by which the data D16 closest to the query Q can be identified with the minimum hop count.

Hereinafter, the data D3, the data D8, the data D11, and the data D18 as the entry point candidates are referred to as an entry point candidate D3, an entry point candidate D8, an entry point candidate D11, and an entry point candidate D18, respectively. In addition, a score output from a node associated with an entry point candidate DX (X is an integer greater than or equal to 0; X in the example of FIG. 14 takes 3, 8, 11, or 18) is referred to as a score of the entry point candidate DX.

Note that the neural network model 43*a* illustrated in FIG. 14 is merely an example. The number of layers included in the neural network model 43*a*, the number of nodes in the hidden layers, the connection relationships among the nodes, the calculation method in each node, and others can be variously modified by a designer.

Figure 15:
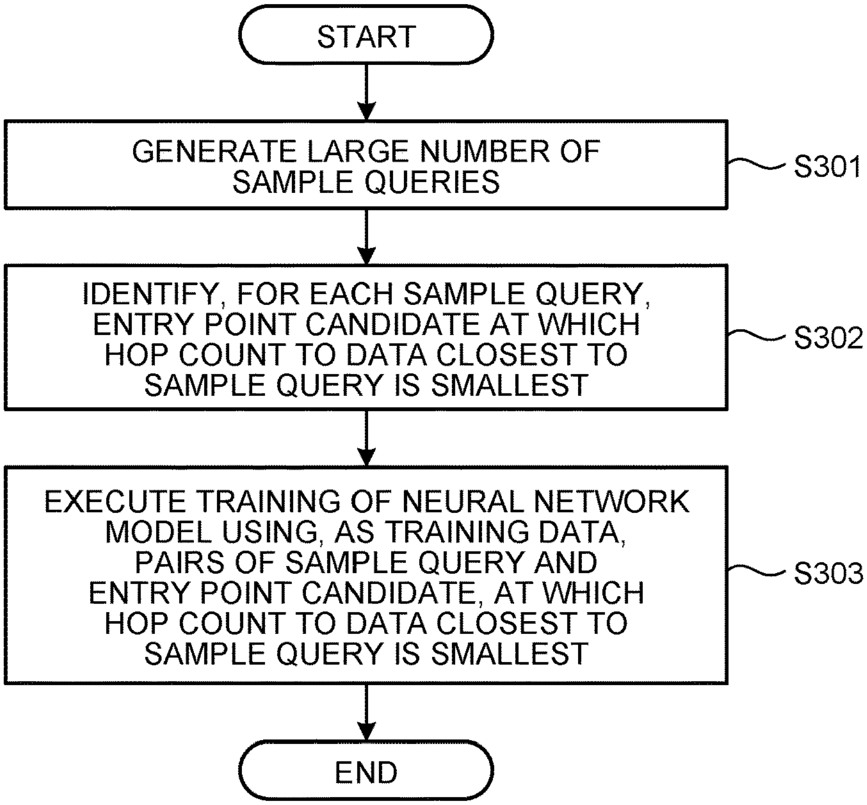
FIG. 15 is a flowchart describing an example of a training method of the neural network model according to the second embodiment.

FIG. 15 is a flowchart describing an example of a training method of the neural network model 43*a* according to the second embodiment. Note that the series of processing illustrated in this drawing may be executed in the information processing device 1*a* or may be executed in any other computer. Note that the series of processing illustrated in this drawing is executed in a computer that can access the same group as the group of the data D stored on the SSD 3. As an example, a description will be given herein on the premise that the processor 2 in the information processing device 1*a* executes the series of processing illustrated in this drawing.

First, the processor 2 generates a large number of sample queries in a similar manner to that of the first embodiment (S301).

Subsequently, the processor 2 identifies, for each sample query, an entry point candidate by which the data D closest to the sample query Q can be obtained with the minimum hop count (S302). The processor 2 is allowed to take time for accurately obtaining such an entry point candidate.

Subsequent to S302, the processor 2 executes training of the neural network model 43*a* by using, as training data, a large number of obtained pairs of a sample query and an entry point candidate by which the data D closest to this sample query can be obtained with the minimum hop count (S303). As a result, the weight for each node is determined, and the model information 42*a* is generated. Then, the training is completed.

Figure 16:
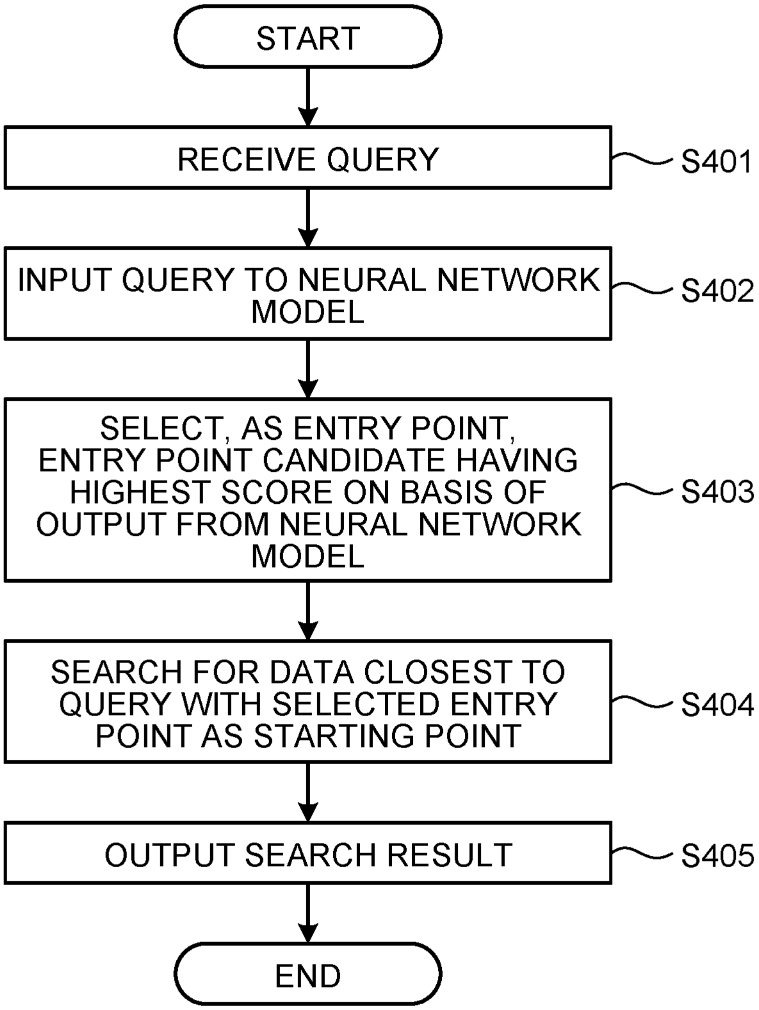
FIG. 16 is a flowchart describing an example of a nearest neighbor search method according to the second embodiment.

FIG. 16 is a flowchart describing an example of a nearest neighbor search method according to the second embodiment. The processor 2 executes a series of processing illustrated in the drawing in accordance with the search program 41*a*.

Upon receiving a query Q input to the information processing device 1*a* (S401), the processor 2 inputs the query Q to the neural network model 43*a* (S402).

The processor 2 selects an entry point candidate having the highest score as an entry point, on the basis of the scores of the respective entry point candidates output from the neural network model 43*a* (S403). Then, the processor 2 executes the graph-based nearest neighbor search with the group of the data D in the SSD 3 used as a search range and the selected entry point as the starting point. As a result, the processor 2 searches for the data D closest to the query Q in the group of the data D in the SSD 3 (S404).

Specifically, the processor 2 selects the selected entry point as the first candidate data and calculates the metric of the distance between the candidate data and the query Q. Then, the processor 2 performs a hopping along the graph starting from the selected entry point and calculates the metric of the distance between new candidate data identified by the hopping and the query Q. Subsequently, the processor 2 compares the indices of the distances between the candidate data and the query Q before and after the hopping and determines whether or not the distance to the query Q has become shorter by the hopping. The processor 2 searches for the data D closest to the query Q in the group of the data D in the SSD 3 by repeating the hopping, the calculation of the metric of the distance between the candidate data and the query Q, and the comparison of the indices of the distance before and after the hopping.

The processor 2 outputs the data D obtained by the search as a search result (S405). Then, the series of processing of the nearest neighbor search ends.

As described above, according to the second embodiment, the processor 2 receives the input of the query Q and selects one entry point on the basis of the neural network model 43*a*. The processor 2 executes the graph-based nearest neighbor search with the group of the data D in the SSD 3 used as a search range and the selected entry point as the starting point. The processor 2 identifies the data D closest to the query Q in the group of the data D in the SSD 3 by the nearest neighbor search.

Therefore, the speed of the query response and the accuracy of the search can be both enhanced.

Moreover, according to the second embodiment, the neural network model 43*a* is configured, in response to receiving the query Q, to output, for each entry point candidate, a score representing a possibility that the data D closest to the query Q in the group of the data D stored in the SSD 3 can be obtained with the minimum hop count. The processor 2 inputs the query Q to the neural network model 43*a* and selects, as the entry point, an entry point candidate with the highest possibility that the data D closest to the query Q can be obtained with the minimum hop count, on the basis of the score for each entry point candidate output from the neural network model 43*a*.

Therefore, the speed of the query response can be enhanced.

Note that, in the above-described second embodiment, the processor 2 selects, as the entry point, the entry point candidate having the minimum hop count to the data D closest to the query Q. The processor 2 may select, as the entry point, any one of entry point candidates by which the data D closest to the query Q can be obtained with a predetermined hop count or less.

Specifically, the neural network model 43*a* is configured, in response to receiving the query Q, to output, for each entry point candidate, a score representing a possibility that the data D closest to the query Q can be reached with the predetermined hop count or less, in the group of the data D in the SSD 3. The processor 2 inputs the query Q to the neural network model 43*a* and selects, as the entry point, an entry point candidate having the highest possibility that the data D closest to the query Q can be reached with the minimum hop count or less, on the basis of the score for each entry point candidate output from the neural network model 43*a*.

In addition, the processor 2 may select, as the entry point, an entry point candidate for obtaining data, which is found by executing the nearest neighbor search with a predetermined hop count, is the closest to the query Q.

Specifically, the neural network model 43*a* is configured, in response to receiving the query Q, to output, for each entry point candidate, a score representing the possibility that the data D, which is found by a search with the predetermined hop count, is the closest to the query Q in the group of the data D in the SSD 3. The processor 2 inputs the query Q to the neural network model 43*a* and selects, as the entry point, an entry point candidate having the highest possibility that the data D found as a result of a search with the predetermined hop count is the closest to the query Q, on the basis of the score for each entry point candidate output from the neural network model 43*a*.

As described in the first embodiment, the modification of the first embodiment, and the second embodiment, a nearest neighbor search method includes receiving input of the query Q and selecting one of the first objects on the basis of the query Q and the neural network model 43 or 43*a*. Each of the first objects is associated with one or more pieces of data D in the group of pieces of data D stored on the SSD 3. The nearest neighbor search method further includes calculating the metric of the distance between data D and the query from one or more pieces of data D with which the selected one first object is associated. The method further includes identifying data D closest to the query Q in the group of the data D on the basis of the metric of the distance.

Therefore, the speed of the query response and the accuracy of the search can be both enhanced.

While some embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method performed by an information processing device including a first memory and a second memory capable of operating at a higher speed than the first memory, the method comprising:

receiving a query from outside the information processing device;

inputting the query to a neural network model in the second memory, the neural network model having been trained to identify a first object associated with one or more pieces of first data including first data closest to the query in a group of the first data from a plurality of first objects, the neural network model being configured to output a score for identifying the first object, each of the first objects being associated with one or more pieces of first data in the group of first data stored in the first memory, the neural network model having been trained by using a plurality of pairs of a sample query and a first object to which first data closest to the sample query belongs as training data;

selecting the first object in accordance with the score output from the neural network model;

transferring one or more pieces of second data from the first memory to the second memory, the one or more pieces of second data being one or more pieces of first data associated with a second object, the second object corresponding to the selected first object and being the one of the first objects having been selected;

calculating a metric of a distance between the query and the one or more pieces of second data;

identifying third data on the basis of the metric of the distance, the third data being first data closest to the query in the group of the first data; and outputting the third data to outside the information processing device, wherein each of the first objects is associated with a different one of sub-groups of one or more pieces of first data in the group of the first data, the score represents a possibility that one or more pieces of first data represented by a first object includes the first data closest to the query in the group of the first data, and the identifying the third data includes identifying, as the third data, second data closest to the query among the one or more pieces of second data.

2. The method according to claim 1, further comprising transferring the one or more pieces of second data from the first memory to the second memory, wherein the calculating includes calculating the metric of the distance between the query and each of the one or more pieces of second data in the second memory.

3. The method according to claim 2, wherein the one or more pieces of first data associated with each of the first objects are stored in a continuous area in an address space of the first memory.

4. The method according to claim 1, wherein the first memory includes a NAND flash memory device.

5. The method according to claim 4, wherein the second memory includes a DRAM (Dynamic Random Access Memory).

6. A method performed by an information processing device including a first memory and a second memory capable of operating at a higher speed than the first memory, the method comprising:

receiving a query from outside the information processing device;

inputting the query to a neural network model in the second memory, the neural network model having been trained to identify first data in a plurality pieces of second data included in a group of third data stored in the first memory, the group of the third data constituting a graph, the first data being second data that a hop count to fourth data is a minimum, the fourth data being third data closest to the query in the group of the third data, the neural network model being configured to output a score for each piece of the second data, the score representing a possibility that the hop count to the fourth data is the minimum, the neural network model having been trained by using a plurality of pairs of a sample query and second data with the minimum hop count to third data closest to the sample query as training data;

selecting the first data in accordance with the score output from the neural network model;

identifying the fourth data by performing, on the basis of the graph, a search in which entry point is the first data; and outputting the third data to outside the information processing device.

7. The method according to claim 6, wherein the first memory includes a NAND flash memory device.

8. The method according to claim 7, wherein the second memory includes a DRAM.

9. An information processing device comprising:

a first memory configured to store a group of first data;

a second memory capable of operating at a higher speed than the first memory; and a processor connected to the first memory and configured to:

receive a query from outside the information processing device, input the query to a neural network model in the second memory, the neural network model having been trained to identify a first object associated with one or more pieces of first data including first data closest to the query in the group of the first data from a plurality of first objects, the neural network model being configured to output a score for identifying the first object, each of the first objects being associated with one or more pieces of first data in the group of first data stored in the first memory, the neural network model having been trained by using a plurality of pairs of a sample query and a first object to which first data closest to the sample query belongs as training data;

select the first object in accordance with the score output from the neural network model, transfer one or more pieces of second data from the first memory to the second memory, the one or more pieces of second data being one or more pieces of first data associated with a second object, the second object corresponding to the selected first object and being the one of the first objects having been selected, calculate a metric of a distance between the query and the one or more pieces of second data, identify third data on the basis of the metric of the distance, the third data being first data closest to the query in the group of the first data, and output the third data to outside the information processing device, wherein each of the first objects is associated with a different one of sub-groups of one or more pieces of first data in the group of the first data, and the score represents a possibility that one or more pieces of first data represented by a first object includes the first data closest to the query in the group of the first data, and the processor is further configured to:

identify, as the third data, second data closest to the query among the one or more pieces of second data.

10. The information processing device according to claim 9, wherein the processor is further configured to:

transfer the one or more pieces of second data from the first memory to the second memory, and calculate the metric of the distance between the query and each of the one or more pieces of second data in the second memory.

11. The information processing device according to claim 10, wherein the processor is further configured to store the one or more pieces of first data associated with each of the first objects in a continuous area in an address space of the first memory.

12. The information processing device according to claim 9, wherein the first memory includes a NAND flash memory device.

13. The information processing device according to claim 12, wherein the second memory includes a DRAM.

14. An information processing device comprising:

a first memory configured to store a group of first data;

a second memory capable of operating at a higher speed than the first memory; and a processor connected to the first memory and configured to:

receive a query from outside the information processing device, input the query to a neural network model in the second memory, the neural network model having been trained to identify first data in a plurality pieces of second data included in a group of third data stored in the first memory, the group of the third data constituting a graph, the first data being second data that a hop count to fourth data is a minimum, the fourth data being third data closest to the query in the group of the third data, the neural network model being configured to output a score for each piece of the second data, the score representing a possibility that the hop count to the fourth data is the minimum, the neural network model having been trained by using a plurality of pairs of a sample query and second data with the minimum hop count to third data closest to the sample query as training data;

select the first data in accordance with the score output from the neural network model, identify the fourth data by performing, on the basis of the graph, a search in which entry point is the first data; and output the third data to outside the information processing device.

15. The information processing device according to claim 14, wherein the first memory includes a NAND flash memory device.

16. The information processing device according to claim 15, wherein the second memory includes a DRAM.

* * * * *